United States Patent
Finlay et al.

(10) Patent No.: US 10,067,962 B2
(45) Date of Patent: *Sep. 4, 2018

(54) EXPRESSION BASED SYNOPSIS OF DATABASE TABLES

(71) Applicant: International Business Machines Corporation, Armonk, NY (US)

(72) Inventors: Ian R. Finlay, Uxbridge (CA); Abhinav Goyal, Markham (CA); Robin D. Grosman, Markham (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,202

(22) Filed: Jun. 30, 2017

(65) Prior Publication Data
US 2017/0300515 A1    Oct. 19, 2017

Related U.S. Application Data

(63) Continuation of application No. 14/868,680, filed on Sep. 29, 2015.

(51) Int. Cl.
*G06F 17/30* (2006.01)

(52) U.S. Cl.
CPC .. *G06F 17/30315* (2013.01); *G06F 17/30501* (2013.01)

(58) Field of Classification Search
CPC .............................................. G06F 17/30315
See application file for complete search history.

(56) References Cited

U.S. PATENT DOCUMENTS

| | | | |
|---|---|---|---|
| 8,583,692 B2 | 11/2013 | Ganesh et al. | |
| 9,519,676 B1* | 12/2016 | Finnie | G06F 17/30377 |
| 2003/0229610 A1* | 12/2003 | Van Treeck | G06F 17/30557 |
| 2011/0295793 A1* | 12/2011 | Venkatasubramanian | G06F 17/30563 707/602 |
| 2012/0036165 A1* | 2/2012 | Driesen | G06F 17/30286 707/803 |
| 2012/0284303 A1 | 11/2012 | Fish et al. | |
| 2015/0363404 A1* | 12/2015 | Dickie | G06F 17/30492 707/741 |
| 2016/0188623 A1* | 6/2016 | Finlay | G06F 17/30153 707/690 |

(Continued)

OTHER PUBLICATIONS

Appendix P List of IBM Applications and Patents treated as related. Two Pages. Dated Jun. 30, 2017.

*Primary Examiner* — Mahesh H Dwivedi
(74) *Attorney, Agent, or Firm* — Stephen R. Yoder (57) ABSTRACT

Although many techniques provide ways to answer queries very quickly by either avoiding joins and/or aggregation or avoiding expression computations in order to apply filtering predicates, these techniques have significant potential overhead for maintenance, and require a great deal of storage space. The present invention discloses the use of synopsis or zone tables to expressions to provide powerful filtering capabilities to base tables across joins, and aggregations on join results, thus allowing for highly effective region or stride filtering and ordering aggregate ranges to select the most likely candidate tuples for joining to produce top-N or bottom-N result sets for queries.

4 Claims, 3 Drawing Sheets

(56) References Cited

U.S. PATENT DOCUMENTS

2016/0196302 A1* 7/2016 Beavin .............. G06F 17/30466
      707/714
2017/0091315 A1  3/2017 Finlay et al.

* cited by examiner

EXPRESSION BASED SYNOPSIS OF DATABASE TABLES

BACKGROUND

The present invention relates generally to the field of database management, and more particularly to synopsis tables for databases.

In database systems, materialized query tables (MQTs), automatic summary tables (ASTs), and indexes on expressions have become commonplace and are widely used in the database management industry.

A materialized query table is a table whose definition is based upon the result of a query. The data that is contained in an MQT is derived from one or more tables on which the materialized query table definition is based. An automatic summary table is considered to be a specialized type of MQT that contains a GROUP BY clause summarizing data from the tables that are referenced. MQTs can significantly improve the performance of queries, especially complex queries. MQTs may be large or a large number of MQTs may be required so that they can be exploited for a large spectrum of queries.

Generated columns are another way of materializing expression results in a table. These expression results are computed and stored as extra columns in a table and along with an index can be exploited for performance by queries with predicates using these expressions. The materialization of these expressions has storage overhead both in the table and the accompanying index if present.

Indexes on expressions or function based indexes are yet another mechanism of pre-computing expressions on columns of a table and storing these along with pointers to or the address of the rows in the table. These indexes can be used to optimize table access when the expressions are used in predicates in queries.

Metadata in the form of synopsis tables are often used to skip strides (or zones or regions) of a table. These synopsis tables may store the minimum, maximum and/or a bit filter of all the values in a table column belonging to a stride or zone or region. For example a set of 1000 rows (or a page of rows) may make up a stride. Knowing the minimum and maximum value of a column for these rows may allow the database to skip the stride (or page) if it could be determined based on a predicate in the query that the stride (or page) does not contain any row of interest to query. Synopsis tables are significantly smaller than the base tables that they are associated with. For a stride size of 1000 rows the synopsis tables could have 1/1000 of the number of rows in the base table.

SUMMARY

In one aspect of the present invention, a method, a computer program product, and a system for using synopsis on expressions, includes computing one or more new columns on a database table, the new columns while themselves not being materialized in the table being computed using the expressions on values from one or more old columns in each tuple in the database table; creating meta-data associated with the new columns, the meta-data being created for each region of the database table by streaming values in the new columns to a database synopsis table function; storing the meta-data in the database synopsis table; and applying the stored meta-data to one or more predicates, the predicates expressions matching the meta-data expressions of the database synopsis table completely or partially.

DETAILED DESCRIPTION

A method for using synopsis tables (also referred to as zone tables or region tables) for expressions is provided. Meta-data about non-materialized generated columns, join results and computed aggregate column(s) are stored in a synopsis table, providing powerful filtering capabilities to base tables, base tables across joins and aggregations on join results. Thus, highly effective region/stride filtering and/or ordering aggregate ranges are allowed to select the most likely candidate tuples for base table access, joining and to produce top-N/bottom-N result sets for queries. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
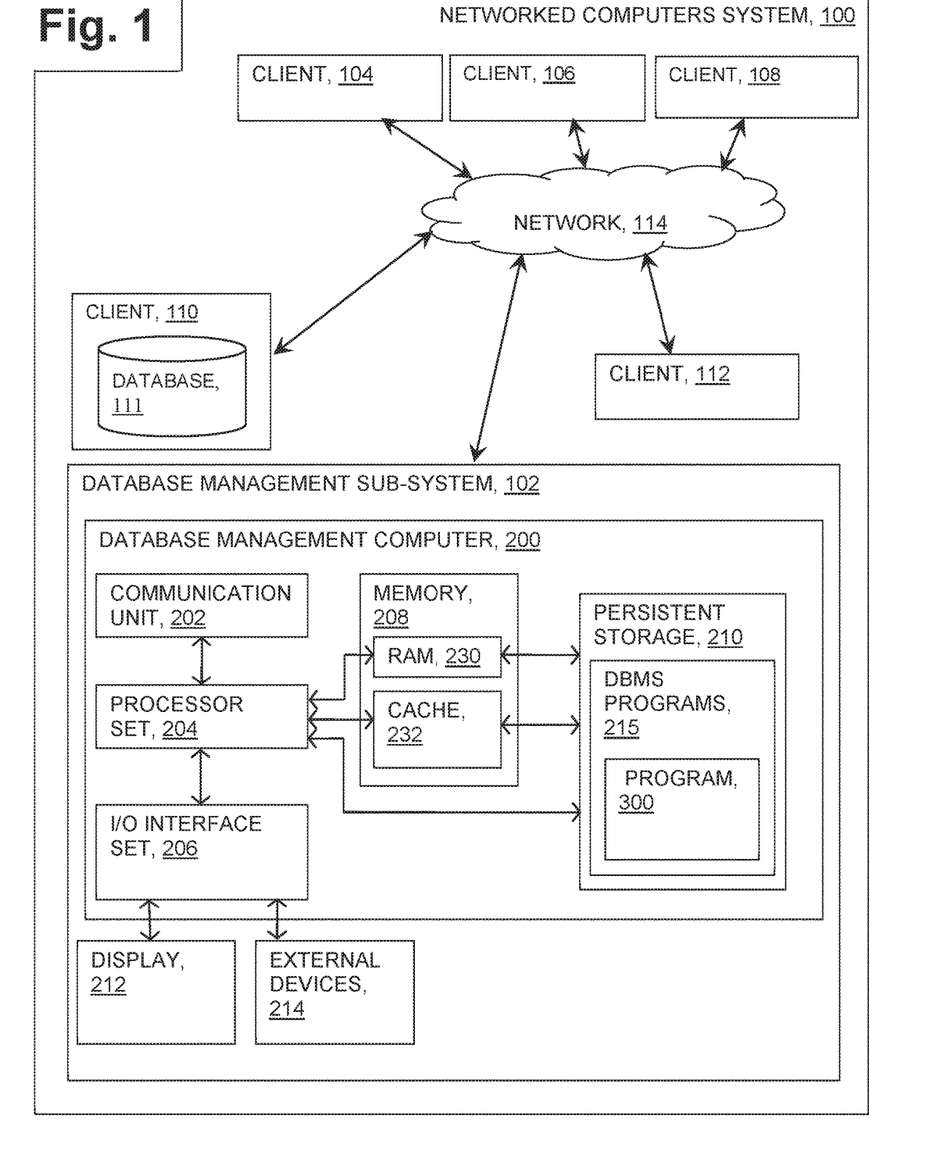
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: database management (DBM) sub-system 102; client sub-systems 104, 106, 108, 110, 112; database 111; communication network 114; database management computer 200; communication unit 202; processor set 204; input/output (I/O) interface set 206; memory device 208; persistent storage device 210; display device 212; external device set 214; database management system (DBMS) programs 215; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Program 300 is located within DBMS programs 215, where other programs (not shown) carry out various functions of database management. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Database 111 is an organized collection of data. The data is typically organized to model aspects of reality in a way that supports processes requiring information. For example, modelling the availability of rooms in hotels in a way that supports finding a hotel with vacancies.

Program 300 operates to add meta-data only columns to a synopsis table. Further, program 300 gathers meta-data associated with aggregates or computed values that are calculated for each stride or range of rows. Further, program 300 gathers meta-data associated with join result column based on a PK/FK (primary key/foreign key) relationship, allowing for the direct filtering of a fact table based on the meta-data of a "flattened" dimension. Further, program 300 gathers meta-data associated with aggregates or grouping results based on a join that are computed for direct filtering or top-N style queries to hone in on the most likely candidate strides or zones of a base table.

Some embodiments of the present invention recognize the following facts, potential problems and/or potential areas for improvement with respect to the current state of the art: (i) fast query response for complex aggregates and/or joins continues to be a goal for database systems; (ii) query response for filtering predicates on computed values and/or aggregates tends to be slow and/or expensive due to the need to compute values over large number of tuples of a table or join result, before being able to filter and/or eliminate results; and/or (iii) the conventional solutions have significant potential overhead for maintenance, and require a great deal of storage space.

Fast query response for complex aggregates and joins continues to be a goal for database systems. Conventionally, techniques used to achieve this include: methods to avoid or limit joins and methods to avoid or limit aggregation. Query response for filtering predicates on computed values and/or aggregates tends to be slow and/or expensive due to the need to compute values over large number of tuples of a table or join result, before being able to filter and/or eliminate results.

Conventionally, there are a number of solutions to the above mentioned problems. For example, materialized query tables or automatic summary tables provide pre-computed tables that allow direct "look up" for answers and filtering for queries; indexes on expressions provide pre-computed column(s) that allow direct "look up" for answers and filtering for queries; and generated columns also provide pre-computed column(s) that allow direct "look up" for answers and filtering for queries.

Conventionally, with indexes on expressions (also referred to as expression-based indexes), the performance of queries that involves expressions is improved if an index that is created on the same expressions is chosen. Expression-based indexes are best suited when an efficient evaluation of queries that involve a column expression is demanded. Compared to simple indexes, the index key values of expression-based indexes are not the same as values in the table columns. Instead, the values are transformed by the expressions that are specified.

In columnar database systems, indexes are rare, and for MQTs and/or ASTs, while possible, indexes are not widely used. All of these techniques provide ways to either answer queries very quickly by avoiding joins and/or aggregation (e.g., MQTs) or avoiding expression computations in order to apply filtering predicates (e.g., index on expression), however, those solutions have significant potential overhead for maintenance, and require a great deal of storage space.

Conventionally a generated column (also referred to as a computed column) is stored either in an MQT or as a computed column that is added to the base table. A generated column is defined in a table where the stored value is computed using an expression, rather than being specified through an insert or update operation. Generated columns are used to improve performance of queries. For example, when issuing a query that includes the same expression, the generated column can be used directly; or, the query rewrite component of the optimizer can replace the expression with the generated column.

In some embodiments of the present invention, instead of storing the instantiated and/or generated column in the table, meta-data is gathered on the computed column and stored in the synopsis table (also referred to as a zone table or a region table). That is, some embodiments of the present invention entail the addition of a meta-data only computed column to a synopsis table. The meta-data gathered could include, but is not limited to, the high value for a stride, zone, or region, the low value for the stride, zone, or region, and/or a Bloom filter for the stride, zone, or region. Herein, a stride (also referred to as a zone, or region) is a contiguous portion or block of a table. Strides, zones, and regions are referred to herein generally as strides unless stated otherwise.

In some embodiments of the present invention, the generated column may be in the form of a foreign-key/primary key look-up from a fact table to a dimension table, summarizing the result of that join for a stride into a meta-data synopsis table.

In some embodiments of the present invention, the generated column may be an aggregate from a fact table into a dimension table, with the result of that aggregate summarized or abstracted for a stride into one or more columns of meta-data in a synopsis table.

All of these computations require some form of consistent, repeatable computation/look up/joining that can be tracked easily to the specific zone/region/synopsis entry for verification after any insert, update and/or delete activity.

Figure 2:
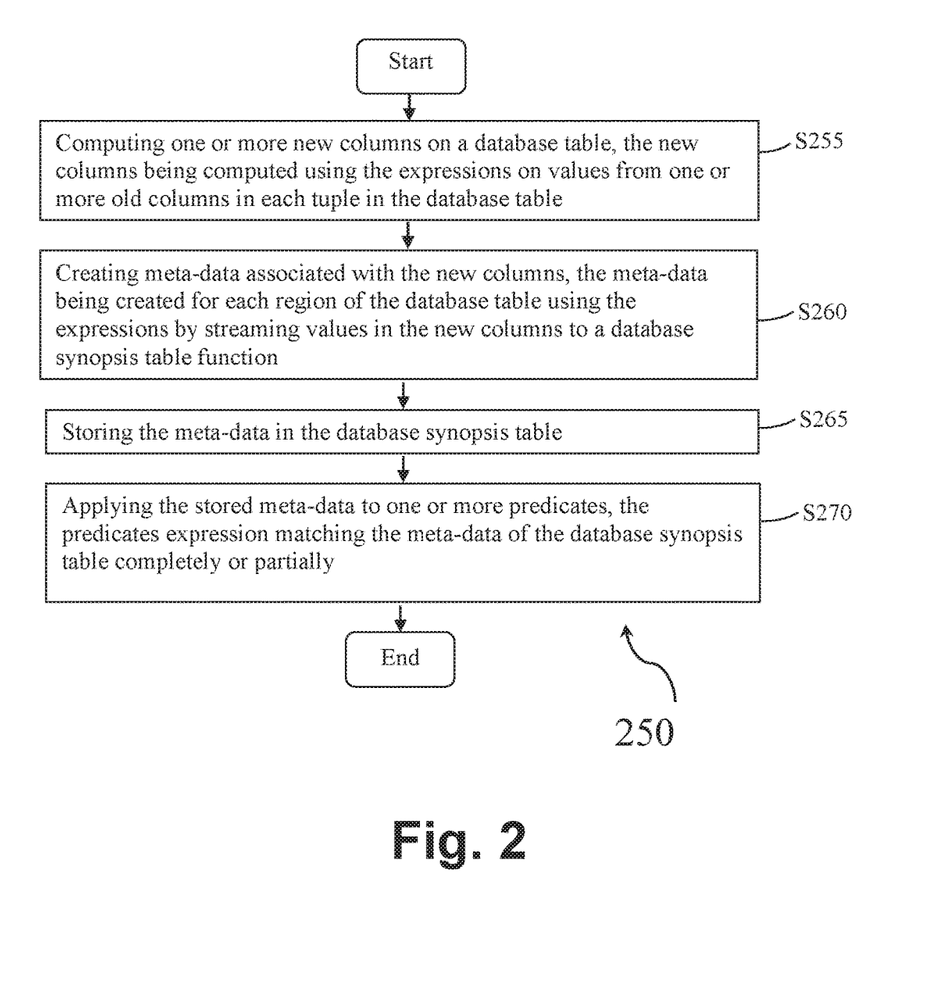
FIG. 2 is a flowchart depicting an embodiment of a method that may be performed, at least in part, by the system depicted in FIG. 1.
Figure 3:
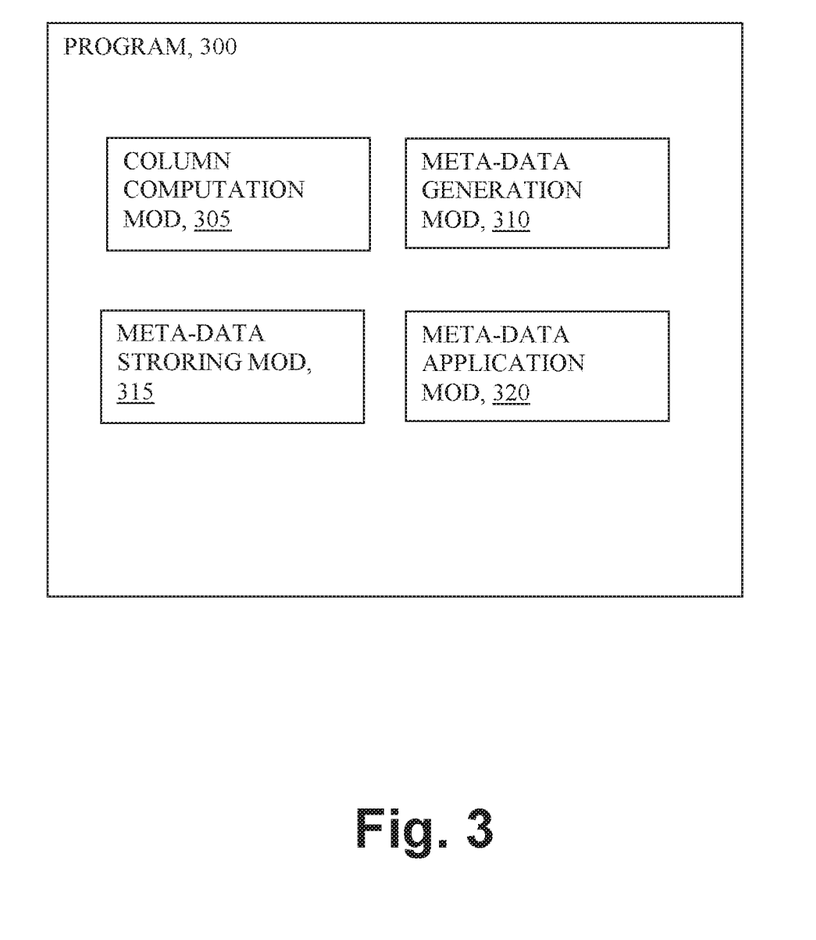
FIG. 3 is a schematic view of a machine logic (for example, software) portion of the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where column module ("mod") 305 computes one or more new columns for a database table. The new columns are computed using the expressions on values from one or more old columns in each tuple in the database table. It should be noted that in this application, the term "tuple" refers to a set of data represented by a single row in a table. The expression may include some functions and computations. In one embodiment where generated column infrastructures are involved for computed column-based meta-data, a new column is computed based on values from one or more old columns in each tuple of the database table. In this example, a single base table is involved, and the expression may involve a function, for example, UPPER ( ). The expression result is computed only from values in a single row of the base table. For example, a new column is computed for UPPER (c1), to provide the ability to filter a base table after an UPPER function has been applied to the column c1 in the base table.

TABLE 1

A SALES_FACT table

| DATE_ID | TNX_ID | SLS_AMT |
|---------|--------|---------|
| 2010 Jan. 1 | 31 | 125.00 |
| ... | | |
| ... | | |
| 2015 Sep. 1 | 203357 | 63.00 |

As an illustrative example, a SALES_FACT table is shown in Table 1 having 100,000,000 rows. Typically, the data in Table 1 is more or less ordered according to the date in DATE_ID column as new data is inserted. Table 2 shows a synopsis table of the SALES_FACT table. This synopsis table has 100,000 rows with each row in the synopsis table representing a stride for every 1000 rows that is much smaller than the SALES_FACT table. According to some embodiments of the present invention, the synopsis table in Table 2 has two added columns MIN_YM and MAX_YM corresponding to a generated column YM (i.e. year and month) based on the expression: YEAR(DATE_ID)*100+ MONTH(DATE_ID). To respond to a query: SELECT DATE_ID, SUM (SLS) FROM SALES_FACT WHERE YEAR (DATE_ID)*100+MONTH (DATE_ID)=201508, all strides in SALES_FACT, except for the last two strides as denoted by the last two rows respectively in Table 2, are skipped, because the predicate expression result 201508 in the query is located between MIN_YM and MAX_YM of the last two strides only. Thus, based on the meta-data (i.e., MIN_YM and MAX_YM) of the generated column computed according to the expression, search scope for the query is narrowed by skipping rows of the SALES_FACT table without materializing the generated column in 100,000,000 rows of the SALES_FACT table.

TABLE 2

A synopsis table of the SALES_FACT table in Table 1.

| MIN DATE_ID | MAX DATE_ID | MIN TXN_ID | MAX TXN_ID | MIN SLS_AMT | MAX SLS_AMT | MIN YM | MAX YM |
|-------------|-------------|------------|------------|-------------|-------------|--------|--------|
| 2010 Jan. 01 | 2010 Mar. 31 | | | | | 201001 | 201003 |
| 2010 Mar. 15 | 2010 May 30 | | | | | 201003 | 201005 |
| ... | | | | | | ... | |
| 2010 Nov. 01 | 2011 Jan. 24 | | | | | 201011 | 201101 |
| ... | | | | | | | |
| 2015 Mar. 24 | 2015 May 18 | | | | | 201503 | 201505 |
| 2015 May 15 | 2015 Aug. 07 | | | | | 201505 | 201508 |
| 2015 Jul. 03 | 2015 Sep. 01 | | | | | 201507 | 201509 |

In another embodiment of the present invention where join result column or materialized join is involved, a new column is generated based on the results of a primary-key (PK)/foreign-key (FK) relationship join, adding summary information about a flattened column to a fact table —in effect de-normalizing a schema. That is, the new column is in the form of an FK/PK look-up from a fact table to a dimension table. In such case, the value of a column in a dimension table joined on the PK may be taken and used a column in a fact table. Alternatively, the column value taken from the dimensional table may be part of an expression that may or may not include column values in the fact table row that joins. This is equivalent to an N:1 Join MQT. The flattened column herein refers to "un"-denormalizing a dimension table back into a fact table. For example, a "country" dimension table has the dimensions of country name, short form, capital, and so on, and an FK in the fact table refers to that country dimension table. If the country dimension table is flattened back into the fact table, then those various dimension table columns can be accessed directly from the fact table instead of having to perform a join to get to them. Thus, the synopsis entries can be created for those dimension columns in the fact table to be able to filter (coarsely) on those values from the dimension table.

In yet another embodiment of the present invention where computed aggregation column is involved, the generated column may be an aggregate from a fact table into a dimension table. This is a case where an aggregate is computed from a join between a dimension table and a fact table, with one or more characteristics from the fact table being aggregated, namely, the aggregation result may be based on multiple rows of the fact table. This is equivalent to a summary table for various dimension table hierarchies. For example, an expression may be "SELECT avg (f.c1) from d1, f where d1.pk=f.d1_fk group by d1.pk" where f refers to a fact table; c1 refers to a column in the fact table f; d1 refers to a dimensional table; pk means primary key; and d1_fk means a foreign key of the fact table. Dimension hierarchies herein refer to the possibility of multiple levels of aggregations. For example in a date dimension table (e.g., date_dim), there have the date, month and year hierarchy and aggregations from the fact table on each of these levels The aggregation expression value corresponding to the dimension table row may be computed with a correlated join subquery "SELECT P.prod_key, X.S from PRODDIM P, TABLE (SELECT SUM (F.sales) as S FROM WHERE F.prod_key=P.prod_key) as X", in which the expression S for each prod_key is computed for the dimension table synopsis.

Processing proceeds to step S260, where meta-data generation module 310 creates meta-data associated with the new columns. The meta-data are created for each region of the database table using the expressions by streaming values in the new columns to a database synopsis table function to compute the minimum, maximum and/or Bloom filter to generate meta-data for each stride of the table.

The source of the computation would be stored using the existing mechanisms in the database system for storing generated column formulas—typically a special field that stores the SQL used in generating the column values and possibly the join specification. Thus, an ability is provided to track back to the base table stride and update it as needed. For example, when a new row is inserted into a fact table with a foreign key that has a previously computed aggregate, the aggregate needs to be recomputed and the meta-data for the associated dimension table stride is required to be updated accordingly.

The computed values in the new columns are discarded after the meta-data associated with them are gathered. The meta-data will be used to speed queries by applying the query predicates using the expression on the best meta-data candidates in order to skip strides.

Alternatively, in the case of join result column or materialized join, meta-data is created as summary of a result of that join into the synopsis table using foreign key/primary key look-up from a fact table to a dimension table. Further, the meta-data may be expression values on one or columns from a joined row of the dimension table and the fact table.

Alternatively, in the case of computed aggregate column, meta-data is created by summarizing a result of that aggregate from a fact table into a dimension.

Processing proceeds to step S265, where meta-data storing module 315 stores the meta-data in the database synopsis table. The meta-data may be stored in one or more columns in the synopsis table.

Processing proceeds to stop at step S270, where meta-data application module 320 applies the stored meta-data to one or more predicates. Meta-data can be exploited to skip regions of the base table after matching the expression in the query. The predicates expression matches the meta-data of the database synopsis table completely or partially. For example, expression MONTH ( ) provides the ability to filter a base table on the month(s) that occur in a range or zone of the base table. Thus, when applying a predicate that looks for rows that have just a single month, like April, zones of the base table where it could be determined that April would not be present can be easily skipped.

Alternatively, joining result column based on a PK/FK relationship allows for the direct filtering of a fact table based on the meta-data of a flattened dimension. This would be highly effective in cases where traditionally a dimension table is used to filter a fact table via local predicates applied to the dimension table, and the result of that filtered dimension table is joined to the fact table, to filter the fact table. Predicates can then be projected from the dimension table to the fact table, and applied locally to the fact table, in essence providing an inplace semi-join like filtering directly against the fact table zones or regions. Subsequently the reduced fact table join with the dimension will still need to be done at least for strides that contain more than one dimension column or expression values. For example a dimension column CUSTOMER_STATUS containing values 'GOLD', 'SILVER' and 'BRONZE' may be kept in the fact table meta-data using CASE WHEN CUSTOMER_STATUS='BRONZE' THEN 1 WHEN CUSTOMER_STATUS='SILVER' THEN 2 CUSTOMER_STATUS='GOLD' THEN 3 END. The meta-data columns may be named as CSMAX and CSMIN. A query may have CUSTOMER_STATUS='GOLD'. By transferring this to the fact table meta-data column, strides where 3 is outside the range of CSMIN and CSMAX are skipped. As such, all the strides that contain only 1 and/or 2 corresponding to 'SILVER' and 'BRONZE' are skipped. In this case, the column or expression, an RI-like relationship is established between the fact and dimension tables in order to be able to maintain the fact table's meta-data about the join results. Further, predicates expressions on columns of both the fact table and the dimension table may be applied, for example: SELECT F.transactionID FROM FACT F, PRODDIM P WHERE F.prod_key=P.prod_key and F.sales_quantity*P.prod_cost*(1−P.prod_discount/100)> 100, herein this expression in the fact table synopsis is considered using prod_key for the lookup join: F.sales_quantity*P.prod_cost*(1−P.prod_discount/100).

Alternatively, in the case of aggregates or grouping results based on a join, meta-data gathered and stored for zones or regions of the dimension table allow for direct filtering or top-N style queries to hone in on the most likely candidate strides or zones of a table. In the case of very large dimension tables and fact tables, this allows for filtering of zones or regions of the dimension table to pre-qualify candidate zones or regions of the fact table for computation of top-N/bottom-N aggregates or aggregates that qualify computations. For example: a generated column in an order table to provide meta-data about the total cost of an order, based on summing line items from a LineItem table for each order. With this, it would be much faster/easier to find the zones of the order table that will provide high value total order candidates, that can then be computed much more selectivity than had this 'hint' not existed.

Some embodiments of the present invention may include one, or more, of the following features, characteristics and/or advantages: (i) providing powerful filtering capabilities to base tables across joins, and aggregations on join results; (ii) allowing for highly effective region or stride filtering and ordering aggregate ranges to select the most likely candidate tuples for joining to produce top-N/bottom-N result sets for queries; (iii) requiring very small amount of space for storing meta-data—typically $1/1000$ or less of the space required to store the full information materialized in a base table or in a materialized query table/automatic summary table; (iv) providing "hints" about the computed values/join results for a stride or zone, at a small fraction of the storage; (v) causing the recalculation for just the row(s) affected and the high/low value adjusted only if the new value qualifies, due to operation of inserts, updates and/or deletes; (vi) resulting in very few updates to the synopsis or zone table due to operation of insert/update/delete; and/or (vii) being able to combine with other technologies to provide fast answers to more complex queries with join, aggregate or computed column predicates, allowing for limiting the underlying number of zones or strides of a base table.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for using synopsis on expressions, the method comprising:
   computing new columns on a database table, the new columns being computed using expressions on values from old columns in each tuple in the database table;
   creating meta-data associated with the new columns, the meta-data being created for each region of the database table by streaming values in the new columns to a database synopsis table function associated with a database synopsis table;
   storing the meta-data including meta-data expressions in the database synopsis table; and
   applying the stored meta-data to one or more predicates having predicate expressions matching the meta-data expressions of the database synopsis table;
   wherein:
   the new columns are discarded after the meta-data is created;
   the new columns are in a form of an aggregate from a fact table into a dimension table that is summarized into the new columns of a synopsis table associated with the dimension table; and
   the new columns are computed from a join operation between the dimension table and the fact table and are further aggregated for regions of the dimension table.

2. The method of claim 1, wherein the meta-data includes information including a high value for a region of the database table, a low value for the region, and/or a Bloom filter for the region.

3. The method of claim 1, wherein the new columns are in a form of a foreign-key/primary key look-up using a fact table to a dimension table join to retrieve the new columns or an expression value on the new columns from the dimension table and the fact table into the synopsis table, wherein the new columns are generated using a foreign-key/primary-key relationship and any other expression of the new columns of the joined row of the fact table and the dimension table.

4. The method of claim 1, wherein the new columns as a result of evaluating the expressions, are further summarized into the new columns of the synopsis table for each region of the database table.

* * * * *